US006479581B1

(12) United States Patent
Ireland et al.

(10) Patent No.: US 6,479,581 B1
(45) Date of Patent: Nov. 12, 2002

(54) AQUEOUS-BASED POLYAMIDE-AMIC ACID COMPOSITIONS

(75) Inventors: Daniel J. Ireland, Quincy, IL (US); Jan G. Nel, Cumming, GA (US); Robert G. Keske, Gainesville, GA (US)

(73) Assignee: Solvay Advanced Polymers, LLC, Alpharetta, GA (US)

( * ) Notice: Subject to any disclaimer, the term of this patent is extended or adjusted under 35 U.S.C. 154(b) by 0 days.

(21) Appl. No.: 09/519,691

(22) Filed: Mar. 7, 2000

Related U.S. Application Data

(60) Provisional application No. 60/123,961, filed on Mar. 12, 1999.

(51) Int. Cl.$^7$ .......................... C08L 79/08; C08L 77/00; C08L 33/02; C08K 5/17; B32B 15/08
(52) U.S. Cl. ...................... 524/600; 524/608; 524/555; 524/556; 428/364; 428/458
(58) Field of Search ................... 524/600, 608, 524/605, 555, 556; 428/458, 364, 220

(56) References Cited

U.S. PATENT DOCUMENTS

| | | | | |
|---|---|---|---|---|
| 3,507,765 A | * | 4/1970 | Holub ........................ 204/492 |
| 3,528,937 A | | 9/1970 | Reynalds et al. .......... 260/29.2 |
| 3,546,152 A | * | 12/1970 | Bolton ........................ 524/726 |
| 3,920,612 A | * | 11/1975 | Stephens .................... 528/188 |
| 3,925,313 A | | 12/1975 | Kojima et al. .......... 260/47 CP |
| 3,966,655 A | | 6/1976 | Kovacs et al. ......... 260/29.2 N |
| 3,993,630 A | * | 11/1976 | Darmory et al. ............ 525/428 |
| 4,014,834 A | * | 3/1977 | Concannon ................. 524/104 |
| 4,026,876 A | * | 5/1977 | Bateman et al. ............ 528/350 |
| 4,187,204 A | * | 2/1980 | Howard ...................... 523/402 |
| 4,224,206 A | * | 9/1980 | Sollner ....................... 524/600 |
| 4,252,707 A | * | 2/1981 | Ruid .......................... 524/104 |
| 4,467,011 A | | 8/1984 | Brooks et al. .............. 428/245 |
| 4,480,088 A | * | 10/1984 | Pike ........................... 528/353 |
| 4,640,944 A | | 2/1987 | Brooks ....................... 523/205 |
| 4,675,350 A | * | 6/1987 | Marchetti et al. ........... 523/414 |
| 4,960,549 A | * | 10/1990 | Brooks et al. ............. 264/45.5 |
| 4,981,942 A | * | 1/1991 | Bockrath et al. ........... 528/125 |
| 5,230,956 A | | 7/1993 | Cole et al. .................. 428/367 |
| 5,321,097 A | * | 6/1994 | Kawaki et al. ............. 525/424 |

OTHER PUBLICATIONS

J. Poly Sci. A–1, vol. 4, pp. 2607–2616 (1966) "Studies of Thermal Cyclizations of Polyamic Acids and Tertiary Amine Salts" J. A. Kreuz, et al.

J. Poly Sci. C, vol. 23, pp. 45–56 (1968) "Amine Salts of Polypyromellitamic Acids" R. J. W. Reynalds, et al.

Macromolecules, vol. 29, pp. 7342–7350 (1996) "Controlled Molecular Weight Polyimides from Poly(amic acid) Salt Precursors" J. V. Facinelli, et al.

* cited by examiner

*Primary Examiner*—Vasu Jagannathan
*Assistant Examiner*—Callie Shosho
(74) *Attorney, Agent, or Firm*—McDermott, Will & Emery

(57) ABSTRACT

An aqueous-based composition comprising an aqueous solution of the product formed of the combination of a polyamide-amic acid and a triamine, preferably wherein the polyamide-amic acid is prepared from trimellitic acid halide or its equivalent and an aromatic diamine comprising 4,4'-methylenedianiline.

16 Claims, No Drawings

AQUEOUS-BASED POLYAMIDE-AMIC ACID COMPOSITIONS

This application claims the benefit of U.S. Provisional Application No. 60/123,961 filed Mar. 12, 1999.

BACKGROUND OF THE INVENTION

This invention relates to new aqueous-based aromatic polyamide-amic acid compositions that are useful in providing formulations for coating and sizing fibers, metal surfaces, glass surfaces and other materials. The polyamide-amic acid resins comprising the aqueous-based compositions disclosed herein have a high acid number compared with prior art amide-amic acid, and amide-imide resins which results in improved solubility, providing coatings having greater adhesion to substrates because of a greater chemical reactivity. The aqueous polyamide-amic acid compositions of this invention contain only negligible amounts of organic solvents, unlike prior art coating and sizing formulations, and are therefore more desirable for use where energy costs and environmental factors are important considerations.

Aromatic amide-imide polymers and copolymers have been known for more than 30 years, and have been widely accepted commercially for use as wire enamels and electrical varnishes and in a wide variety of other coating uses. These polymers are also used in fiber sizing, as adhesives, and as impregnating resins for fabric and for composites comprising fiber or particulates. Because amide-imide polymers are intractable and substantially insoluble, coating and sizing formulations are generally applied to the work as an amide-amic acid polymer precursor. The polyamide-amic acid resin coating or matrix is then cured thermally, generally at a temperature above about 150° C., forming a polyamide-imide resin.

When used in coating applications polyamide-amic acid resins are most conveniently applied from solution. Because thermal curing generally occurs at temperatures well below the melt temperature of these resins, melt coating processes are not practical. Solvents employed for these purposes generally are polar solvents and have a high boiling point. Nitrogen-containing solvents, for example dimethylacetamide, N-methylpyrrolidone, dimethylformamide and the like are widely employed, and ethers such as tetrahydrofuran have also been found useful. These solvents are difficult to remove from the coating substrate completely, requiring extended drying periods, often at a reduced pressure. According to the art, nitrogen solvents and ether solvents such as tetrahydrofuran have a strong affinity for these polar resins, forming stoichiometric complexes on precipitation. The bound solvent may be difficult to remove from these complexes; for example, polymers precipitated from tetrahydrofuran may contain as much as 19 weight percent (wt. %) or more residual ether solvent, even after extended drying. The energy costs associated with drying and curing, together with necessity for recovery of the volatilized solvent, due to environmental considerations as well as to the cost of the solvent, substantially impacts the commercial attractiveness of polyamide imide resins as coatings.

Alternative methods disclosed in the art include forming a polyamide-amic acid in solution in a polar solvent, precipitating the resin by adding a miscible non-solvent for the polymer, for example water or an alcohol, washing the resin repeatedly to remove residual solvents and water-soluble reaction byproducts, then drying. The solid polyamide-amic acid resin may be compression molded or otherwise fabricated or formed into the desired shape, then cured in the solid state or in the melt by heating the resin article for extended periods, removing water as it forms during curing. Although useful in providing molded articles, particularly where filled resin compositions are employed, this method finds little use in coating and sizing applications because of the low melt flow and intractability of the resin.

Aromatic polyamic acid and polyamide-amic acid resins substantially free of high boiling-point, environmentally-undesirable, polar solvents produced by methods heretofore known and described in the art thus are solid resins, unsuited for direct application as coating or sizing. Aromatic polyamide-amic acid resins are made available to the trade in dry solid form. However, these compositions are neither soluble nor readily dispersible in solvents considered environmentally acceptable, particularly including water. A suitable method for forming aqueous solutions or dispersions of polyamide-amic acids with a low residual solvent level that may be applied to a substrate, dried and cured with a minimum of hydrolysis or otherwise affecting resin detrimentally would be an important advance in the coatings art. Aqueous, low residual-solvent formulations comprising polyamide-amic acid resins would find wide acceptance in the trade and means for providing such compositions would represent an important and useful advance in the coatings art.

BRIEF SUMMARY OF THE INVENTION

This invention relates to aqueous compositions comprising a polyamide-amic acid and to a method for providing aqueous polyamide-amic acid compositions. More particularly, the aqueous compositions of this invention comprise a polyamide-amic acid dispersed in water, preferably dissolved in a mixture comprising water and an amine.

The aqueous compositions of this invention are substantially free of residual polar organic solvent and are useful in providing coatings that adhere well to a variety of substrates, particularly including metals. Formulations useful as sizings and impregnates may also be prepared comprising these aqueous compositions. Coatings and films comprising the aqueous polyamide-amic acid resin component in combination with tertiary amine are readily dried and cured thermally, forming the corresponding polyamide-imide.

DETAILED DESCRIPTION OF THE INVENTION

The aqueous-based polyamide-amic acid compositions of this invention comprise an aromatic polyamide-amic acid dissolved or dispersed in water. Methods for producing polyamide-amic acid resins suitable for use in the practice of this invention are well known in the art and are generally described and disclosed therein, for example, in U.S. Pat. No. 5,230,950, which is hereby incorporated by reference in its entirety. Generally described, polyamide-amic acids are readily prepared by the polycondensation reaction of at least one suitable aromatic polycarboxylic acid or reactive derivative thereof and one or more aromatic diamines. The polymerization is conveniently carried out under substantially anhydrous conditions in a polar solvent and at a temperature below about 150° C., employing substantially stoichiometric quantities of the reactive carboxylic acid component and amine component. A slight stoichiometric excess, typically from about 0.5 to about 5 mole %, of either monomer component, preferably the carboxylic acid anhydride component, may be employed if desired in order to control molecular weight; alternatively a monofunctional reactant may be employed as an endcapping agent for this purpose, and to improve stability.

As will be described in greater detail herein below, polyamide-amic acids useful in the practice of this invention will desirably have a high level of amic acid functionality, and may also be conveniently described and characterized as having a high acid number. Polyamide-amic acids formed from reactive trimellitic acid compounds or similar tricarboxylic acid compounds in theory will comprise one amic acid grouping per tricarboxylic acid repeat unit. Thermally imidizing or curing the resin cyclizes the amic acid groups to form imide links, thereby reducing the level of amic acid functionality and thus lowering the acid number. The polyamide-amic acid resins preferred for use in forming aqueous solutions according to the invention will contain at least 50 mole %, preferably greater than 75 mole %, and more preferably will contain as great as 90 mole % to as much as 100% of the theoretical level of amic acid functionality.

It is thus essential to avoid process conditions during the polymerization and in subsequent processing to isolate and collect the solid polyamide-amic acid that may imidize the polyamide-amic acid. The polyamide-amic acid will therefore be isolated in solid form under mild conditions, preferably by being coagulated or precipitated from the polar reaction solvent by adding a miscible non-solvent, for example water, a lower alkyl alcohol or the like. The solid resin may then be collected and thoroughly washed with water, and centrifuged or pressed to further reduce the water content of the solid without applying heat.

Non-solvents other than water and lower alkyl alcohols are known and have been used in the art for precipitating polyamic acids and polyamide-amic acids from solution including, for example, ethers, aromatic hydrocarbons, ketones and the like. Most such non-solvents are not water soluble and thus are not readily removed from the solid resin by washing, and will therefore not be preferred. Further, high boiling miscible non-solvents may be difficult to separate from the polar reaction solvent and recover for recycle.

To form an aqueous solution of the polyamide-amic acid, the solid resin will be dispersed or dissolved in a mixture comprising water and an aliphatic amine, preferably a tertiary amine.

Combining the solid polyamide-amic acid resin with an amount of a suitable amine effective to substantially neutralize the amic acid functionality and form the corresponding amine salt may suffice to dissolve the polyamide-amic acid. It is known that aqueous compositions comprising polyamic acids and containing greater than 100% of the stoichiometric or neutralizing amount of amine, more particularly from about 110% to about 150%, based on the amount of amic acid groups present in the polymer, are markedly more stable toward hydrolysis, hence formulations based on polyamide-amic acids comprising similarly high levels of amine will be preferred. Aqueous compositions according to this invention that contain an amount of tertiary amine substantially in excess of the stoichiometric amount, most preferably from 150% of the stoichiometric amount to as much as a 5-fold excess, will be more preferred, and still greater levels of amine may be conveniently employed without detrimentally affecting the coating properties of the polyamide-amic acid resin. In addition to improving the solution stability of these compositions, large excesses of the amine may be found to improve the rate of dissolution of the solid resin.

Tertiary amines are known to increase the rate of thermal imidization and curing for polyamic acids, and may be effective in promoting rapid curing of polyamide-amic acid films and coatings. Though aqueous solutions of polyamide-amic acid resin comprising as little as 80% of a stoichiometric amount of amine may be found to have a lower hydrolytic stability, such solutions may find use in applications where solution stability is of less importance than rapid rates of cure.

Neutralizing and dissolving the solid resin may be conveniently carried out in a single operation by adding the resin, preferably in powder form, to the requisite quantity of water containing the tertiary amine. The amount of water employed will generally be sufficient to provide a solution containing from 0.5 to about 20 wt. %, preferably from about 1 to about 16 wt. %, more preferably from about 1 to about 6 wt. % polyamide-amic acid. It may be desirable in preparing the aqueous composition to first combine the solid resin directly with tertiary amine, then let down the mixture by diluting with water.

More particularly described, the polyamide-amic acid resins preferred for use in forming the aqueous compositions of this invention may be prepared by the reaction of trimellitic acid or a derivative thereof such as, for example, a lower alkyl ester of trimellitic acid anhydride or a trimellitic acid halide, preferably the acid chloride of trimellitic anhydride, i.e. trimellitic anhydride chloride (TMAC), with at least one aromatic diamine such as, for example, p-phenylenediamine, m-phenylenediamine, oxybis(aniline), benzidene, 1,5-diaminonaphthalene, oxybis(2-methylaniline) 2,2-bis[4-(p-aminophenoxy)phenyl]propane, bis[4-(p-aminophenoxy)]benzene, bis[4-(3-aminophenoxy)]benzene and 4,4'-methylenedianiline. The preferred aromatic diamine is 4,4'-methylenedianiline (MDA). Examples of other useful aromatic primary diamines are set out in U.S. Pat. No. 3,494,890 (1970) and U.S. Pat. No. 4,016,140 (1977), both incorporated herein by reference.

Aromatic diamines may also be polymerized with tetra-carboxylic acid dianhydrides such as benzophenone tetra-carboxylic acid dianhydride (BTDA), pyromellitic acid dianhydride (PMDA) or the like according to the art to provide polyamic acids. On curing, these polyamic acids form polyimide resin coatings and films. These and similar aromatic dianhydrides disclosed in the art for the preparation of polyimides are also known and described in the art for use in combination with TMAC to provide polyamide-imide copolymer resins. See, for example, U.S. Pat. No. 4,879,345. Polyamide-amic acid resins wherein up to 25 mole % of the TMAC monomer is replaced by one or more such additional dianhydride monomers may also be found useful in the practice of this invention. Alternatively, useful blends comprising the preferred polyamide-amic acid resins and up to 25 wt. % of a prior art polyamic acid resin having a high level of acid functionality as described may also be found useful.

The reaction of a trimellitic acid halide and an aromatic diamine, for example, TMAC and MDA, to form the polyamide-amic acid may be conveniently carried out in a suitable solvent such as N-methylpyrrolidone, (NMP); other polar solvents such as N,N-dimethylformamide (DMF), methyl ethyl ketone (MEK) and N,N-dimethylacetamide (DMAC) and hexamethylphosphoramide (HMPA) can be used.

The mole ratio of MDA to TMAC will preferably lie in the range of from about 0.9:1 to about 1.1:1. Generally the polymerization will be carried out by first combining and dissolving MDA in the solvent in the reaction vessel and then adding TMAC monomer, with stirring. The reaction, which is exothermic, may be conveniently controlled by regulating the rate of addition of the reactants to the reaction vessel and by means of external cooling. The reaction mass will be maintained at a temperature below 150° C. to avoid curing, and preferably in a range of from about 20° C. to about 50° C., more preferably from about 27° C. (80° F.) to about 50° C. (120° F.) for a period of from about 1 to about 10 hr. to complete the polymerization. The reaction time is not critical, and may vary from about 1 to about 24 hr. depending upon reaction temperature, with about 2 to about 4 hr. at a temperature in the range of from 30° C. to about 50° C. being preferred.

The polyamide-amic acid formed by the reaction may be isolated by any convenient means, for example by precipitation with water. The precipitated polyamide-amic acid is washed, preferably with water, and collected by filtering or centrifuging to provide a polyamide-amic acid with a low residual solvent level.

The polyamide-amic acid used in this invention may be further described as a polymer material comprising a mixture of amide-amic acid units which may be represented by the following structural formula:

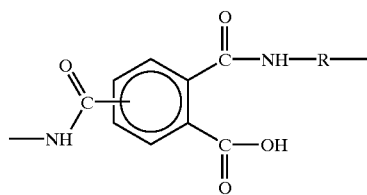

A wherein the attachment of the two amide groups to the aromatic ring as shown will be understood to represent the 1,3 and the 1,4 polyamide-amic acid configurations, together with amide-imide units which may be represented by the following structural formula:

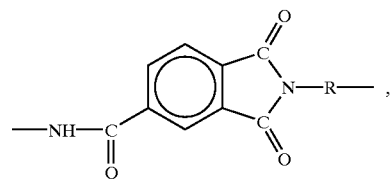

B wherein R in the structure above is the moiety derived from the aromatic diamine component. R may be further described as a substituted or unsubstituted divalent arylene moiety selected from the group consisting of:

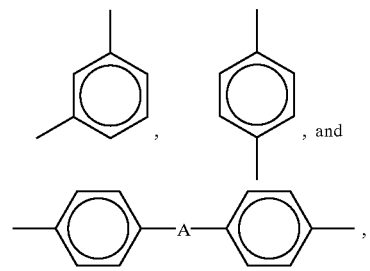

wherein A is a divalent radical, selected, for example, from the group consisting of —SO$_2$—, —CO—, —C(CH$_3$)$_2$—, —O—, —S— and a direct chemical bond. Aromatic diamines having other linking groups are also known in the art and used as monomers in the production of polyamide-imide resins, and most will be found suitable for use according to the practice of this invention.

For the preferred polyamide-amic acid according to the invention wherein the aromatic diamine component is MDA, units A and B may be more particularly represented by the structural formulae

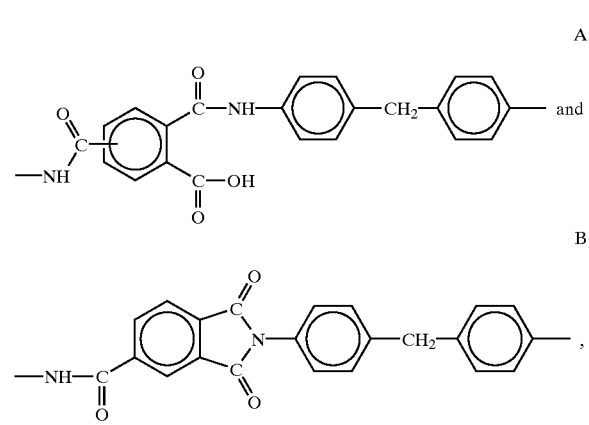

The ratio of A, the amide-amic acid units, to B, the amide-imide units in the polyamide-amic acids of this invention will be high, suitably about 20:1 to about 1.01:1, preferably about 18:1 to about 5:1, most preferably about 16:1 to about 8:1. The units A of the polyamide-amic acid thus will suitably comprise more than 50 mole % of the total sum of amide-amic acid units and amide-imide units in the polymer, preferably more than 75 mole % and most preferably more than 90 mole %. Thus, most of the units in the polyamide-amic acid are in the amic acid form, i.e., A above.

The acid number (milligrams of KOH/gram) of the polyamide-amic acid is suitably greater than 100, preferably in the range of from 100, more preferably 110 and still more preferably greater than 120, and may be up to the theoretical acid number for a resin that comprises only A structural units as shown above. The acid number of a fully-washed resin is primarily a function of the amount of amic acid component, unit A, present in the resin, and may be approximated on a theoretical basis as:

$$\text{Theoretical acid no. (mg KOH)} = \frac{(\text{mole fraction of A units}) \cdot 56}{\text{MW of A units}} 100$$

For example, for a resin formed entirely from methylene dianiline and TMAC in equimolar amounts and containing 1.0 mole fraction A units, the molecular weight of the repeat unit will be 372, and the theoretical acid number will be approximately 150 mg KOH/g of resin. For a resin that is fully imidized, i.e. contains only B units, the acid number would be zero.

It will be understood that the acid number may be higher than the theoretical value if a stoichiometric imbalance favoring the trimellitic component is used in the polymerization, and also if hydrolysis of the amic acid occurs during the polymerization or washing step. Acid number will also be increased by any acid reaction byproducts such as HCl not removed in the washing step and, if the polymer contains acid endgroups, will depend to a lesser degree on polymer molecular weight. These factors may, if appropriate, be taken into account in calculating a corrected theoretical acid number for a resin product. Generally, however, the acid number may be taken as a rough approximation of the degree of imidization that has taken place, i.e. the proportion of A units and B units in the polymer. As indicated, the preferred polyamide-amic acid resin products will have a low level of imidization; the mole fraction of A units will thus be greater than 0.50, and thereby the resin will have a high acid number.

The molecular weight of the polyamide-amic acid will generally be greater than about 1000 to about 10,000, more preferably from about 1,000 to about 6,000 and still more preferably from about 2000 to about 4500 g/mol.

The washed and pressed polyamide-amic acid wetcake, isolated from the reaction mixture by precipitation and filtration, will be a solid, wet powder comprising as much as 80 wt. % water, preferably from about 40 to about 70 wt. % water, based on combined weight of water and polymer. It may be desirable to minimize the water content of the resin wetcake by further pressing or similar conventional means to reduce the water content. However, it is essential that these processes be carried out without subjecting the resin to heat or other conditions which may imidize or cause a reduction in molecular weight, for example by hydrolysis. For most uses, including providing an aqueous solution of the polyamide-amic acid as further described herein below, the wetcake may be conveniently employed without further drying.

As noted, polymerization to form the polyamide-amic acid will be carried out under substantially anhydrous conditions to avoid hydrolysis of the precursors as well as hydrolysis of the polyamide-amic acid. It is well understood in the art that polyamic acids are sensitive to water, particularly when maintained at a neutral or acid pH. The amide function of the amic acid grouping becomes hydrolyzed under these conditions, breaking the polymer chain and causing a loss in molecular weight. It is believed that the aromatic dicarboxylic acid functionality that results from the hydrolysis may thermally cyclize to form an anhydride functionality that is reactive toward amine end-groups. Heating and curing thus may reform the polymer chain, thereby "healing" the polymer. As will be apparent from an examination of structural formula A, polyamide-amic acids including those preferred for use in the practice of this invention contain an amide function in addition to the amic acid grouping. The second amide functionality readily hydrolyzes under acid conditions in the presence of water, forming an aromatic carboxylic acid group that is substantially unreactive. Loss in molecular weight caused by this hydrolysis step, thought to be irreversible, may result in a complete depolymerization of the polyamide-amic acid. It will thus be understood that it is highly desirable to minimize contact with water under conditions that will hydrolyze the polyamide-amic acid.

To form an aqueous composition in solution according to the teachings of the invention, the solid, substantially organic solvent-free polyamide-amic acid described above is mixed with water in the presence of an amine, for example a tertiary amine. The amine will be selected to be miscible with water and volatile, preferably a low-boiling-point tertiary amine that will be readily volatilized during a thermal treatment to cyclize and cure the polyamide-amic acid. Trialkyl amines having limited water solubility such as tri-n-butylamine may also be found useful, particularly if employed together with a suitable water-miscible co-solvent for the amine, for example isopropanol. Ammonia, as well as water-miscible primary and secondary alkyl amines, may also be effective in dissolving the polyamide-amic acid.

However, such amines are generally known to be reactive with amide functional groups and may attack the amide functionality of the polyamide-amic acid, resulting in chain scission; hence these reactive amines will be less preferred.

Preferably the tertiary amine will be a tri-$(C_1$–$C_4$ alkyl) amine such as, for example, trimethylamine, N,N-dimethylethylamine, N,N-dimethyl propylamine, triethylamine or the like. Cyclic tertiary amines may also be found useful, as may any of the variety of well known, water-miscible, tertiary alkanol amines including N,N'-dimethylethanolamine. Although polyfunctional amines such as N,N'-dimethylpiperidine, as well as N,N,N'N'-tetraalkyl-alkaline diamines and poly-N-alkylated alkalene triamines may also be found effective, the polyfunctional amines may tend to form associative crosslinks and gel, and will be less preferred. Most preferred will be triethyl amine.

The amount of polyamide-amic acid that will be dissolved in the mixture of water and amine will depend in part upon the intended use. For most purposes, the solution will comprise from about 0.5 to about 15 wt. %, preferably from about 1 to about 8 wt. %, and more preferably up to about 5 wt. %, polyamide-amic acid based on combined weight of polyamide-amic acid, water and tertiary amine. At higher concentrations, particularly at concentrations above about 20 wt. %, the solution will have a very high viscosity and will not flow readily, and will therefore not be preferred for most coating and sizing applications. At very low resin concentrations, attaining adequate coverage of the substrate at a useful coating thickness becomes difficult; the utility of solutions with a low resin concentration, generally below about 0.5 wt. %, will thus be limited, and therefore are not preferred.

The polyamide-amic acid resin will be combined with an effective amount of tertiary amine sufficient to substantially neutralize the amic acid functionality of the resin and solubilize the polyamide-amic acid in water. Generally, and depending upon the final solids content, the polyamide-amic acid solution will comprise from 0.5 to about 50 wt. % tertiary amine, based on total combined weight of amine, polymer and water. The minimum amount of tertiary amine employed will be approximately the stoichiometric amount required to neutralize the free carboxylic acid groups in the polymer, and more preferably will be from about 0.8 to about 1.2 mole for each mole of free carboxylic acid groups in the polyamide-amic acid. As indicated, an excess of the tertiary amine, as much as a 3–5 fold stoichiometric excess, may be desirable. The ratio of amine to free carboxylic acid groups will thus preferably lie in the range of from about 0.8 to about 5.

The concentration of free carboxylic acid groups in the polyamide-amic acid resin may be determined by any convenient method, for example by titration of an aliquot with a base, and may be readily calculated from the acid number for the resin. Accordingly, the amount of tertiary amine that will be employed in forming aqueous solutions of polyamide-amic acid resins may be determined from the acid number of the resin and the desired ratio of amine to free carboxylic acid groups, using the following formula:

$$\text{pbw amine} = \frac{(\text{resin acid number}) \times (\text{amine MW})}{0.056} C \times (\text{pbw resin})$$

wherein C represents the selected ratio of amine to free carboxylic acid groups. C may have a value in the range of from about 0.8 to about 5 and preferably will be greater than about 1, more preferably from about 1.1 to about 3. As noted, aqueous polyamide-amic acid compositions comprising an excess of the amine are believed to be more stable. Aqueous compositions containing from 10 wt. % to as much as 50 wt. % tertiary amine may be found useful, and aqueous formulations comprising 4–20 wt. % solids and as much as from 60 to 88 wt. % tertiary amine may also find application, particularly in providing resin concentrates.

Any convenient method of combining the components may be employed in preparing the aqueous compositions of this invention. The solid polymer may be added in increments to a stirred mixture of the amine and water, continuing the stirring until the solid resin has been dissolved. Alternatively, tertiary amine may be added slowly to a stirred suspension of polyamide-amic acid in water, with continued stirring until the solid dissolves. As with any acid-base reaction, external cooling may be found necessary initially; subsequent warming and stirring may be desirable to complete dissolution of the solid resin in a reasonable time period.

Aqueous-based solutions according to the invention will thus comprise a polyamide-amic acid, water and a tertiary amine. Generally these water-based compositions have a low level of residual organic solvent, generally less than 8 wt. %, preferably less than about 5 wt. % and more preferably less than about 3 wt. % and compositions comprising from about 0.5 to about 3 wt. % residual organic solvent, based on combined weight of residual organic solvent and polyamic acid may be found to be highly desirable for most applications. Formulations containing as little as 0.1 wt. % and even lower levels of residual organic solvent may also be obtainable, for example by use of extended washings. Such compositions will be highly desired for use in applications where residual solvent cannot be tolerated.

The aqueous-based polyamide-amic acid compositions of this invention may be found particularly desirable in formulations intended for use in coating applications, providing an adherent, high strength continuous coating layer having improved toughness on a coated surface. Such coatings may serve as a binder layer for automotive finishes, to improve adhesion between existing layers of automotive finishes or with other metal finishes.

Polyamide-amic acids are known for having good adhesion to metal surfaces, and aqueous-based compositions of this invention thus may also be found particularly useful in providing formulations for use as enamels in container coating applications; as an additive to automotive electrocoated or solution-based metal coating systems; as a chemically corrosion-resistant coating for metal or other substrates, as a binder layer for non-stick cookware; as a coating for tie bars for usage in cement; as a pretreatment coating for polymer films such as, for example, polyester, polyamide and polyimide film, when used in a metalizing operation; as an adhesive to various plastic or metallic film materials such as liquid crystal polymers and polyimides; as an additive to improve the performance of inks; in a metal powder coating system for use in magnets; and in industrial spray coating applications such as an additive for metallic or plastic thermal spray coating systems.

The substantially organic solvent-free aqueous compositions of this invention may be found useful for film casting where organic solvents may not be desired or tolerated. Formulations commonly employed for solution casting film and for similar coating operations are viscous materials that will flow sufficiently at the coating temperature to be spread over flat surfaces, preferably using a doctor blade or similar apparatus and level to form a smooth, uniform film surface on drying. Thick films may be produced by filling shallow pans with even more viscous solutions, allowing the solution flow under gravity and level to form a smooth surface, slowly evaporating the water and then drying. A wide variety of apparatus and methods for dope casting are well known and widely used commercially, and may be adapted for use with the aqueous formulations of this invention. The solids content of aqueous polyamide-amic acid formulations intended for use in casting operations will be selected on the basis of the substrate and on the intended operating conditions and apparatus, and may comprise from about 0.5 up to about 25 wt. % polyamide-amic acid, more preferably from about 2 to about 15 wt. % polyamide-amic acid, and still more preferably from about 2 to about 8 wt. % polyamide-amic acid.

Further uses for these compositions include as a raw material additive for improved aramid fiber products; as a thermal barrier layer for plastics; as an additive in rubbers for tires and other rubber goods; as an additive for asphalt to improve wear resistance; and as a prepreg material for manufacture of composites. In these and other such compounding operations the polyamide-amic acid component may be added in aqueous solution, or it may be found desirable and useful to add directly as the solid.

Formulations comprising these aqueous-based polyamide-amic acid compositions may also be found useful as sizings, and particularly for fiber material that has a modulus of 8,000,000 psi or greater and is thermally stable to at least 600° F. for at least 10 minutes. Thermally-stable fiber substrates that may be used for these purposes include glass fiber, carbon and graphite fiber, alumina fiber, silicon nitride fiber, boron fiber, aramid fiber, fluorocarbon fiber and the like. The term "carbon fiber" is used herein in the generic sense and includes graphite fibers as well as amorphous carbon fibers that result after a thermal carbonization or graphitization treatment.

Sizing formulations comprising the invented polyamide-amic acid compositions may be advantageously applied to other fibers as well, including fibers comprising nylon, polyester and the like, and to steel or other metal fibers. Such formulations may also be useful to coat steel tire cord and as a high performance adhesive in tire and mechanical rubber goods. The composition of this invention may be used alone or in combination with other resins known for use in sizing applications such as, for example, polyurethane-, epoxy- or acrylic-based sizing compositions.

The sizing may be applied to individual fibers or to multiple fibers in the form of bundles, ribbons, tapes or fabrics, and the like by methods well known and widely practiced in the art for these purposes, including, for example, by drawing the fibers through a bath containing the aqueous sizing formulation or by spraying the sizing formulation onto the fibers and then drying the fibers. Application solids for sizing formulations will usually lie in the range of from about 0.05 to about 10 wt. %, and preferably from about 0.5 to about 5 wt. %, based on the total weight of the solution.

When applied as a sizing or coating, the coated or sized article will then be dried to provide an article having an adherent coating or film comprising polyamide-amic acid. The composition of the dried film or coating is believed to be an ammonium salt comprising the polyamide-amic acid and at least a stoichiometric amount of the amine as described. The salt is thought to be readily dissociated on heating, reforming the polyamide-amic acid. Heating for an extended period at elevated temperatures above 150° C. and generally in the range of from about 200° C. to about 350° C. will imidize or cure the polymer, driving off the amine component altogether along with additional water formed in the imidizing reaction, forming a polyamide-imide film.

Aqueous compositions according to this invention may further contain such additional solvent components and viscosity modifiers as may be desired, with the proviso that added solvent components will be miscible with water and readily volatilized from the polyamide-amic acid on drying and curing. In formulating compositions for coating and blending, conventional polymer lubricants, colorants, fillers, stabilizers and the like may also be employed, again with the proviso that such additives will be selected to be inert and not interact detrimentally with the resin. Compositions comprising high levels of polyamide-amic acid, greater than about 20 wt. %, may be found useful in other applications, and when further modified, for example by adding flow improvers and poor solvents to reduce solution viscosity, may be found to provide additional useful compositions.

Solid polyamide-amic acid in the form obtained by precipitation and washing as described herein above, comprising from 25–40 wt. % resin and substantially free of residual organic solvent, may also be found to be directly useful without being first dissolved, for example as an additive for compounding with rubbers, inks, adhesives and the like.

The invention will be more readily understood from a consideration of the following examples:

EXAMPLES

Example 1

Preparation of Polyamide-amic Acid

Bis(4-aminophenyl)methane (4,4'-methylene dianiline or MDA), 2624 pbw (13.25 moles), was dissolved in 9504 pbw of N-methylpyrrolidone (NMP). The solution was cooled to 10° C. (50° F.) in a glass-lined vessel and agitated while 2800 pbw (13.24 moles) of 4-trimellitoyl anhydride chloride (TMAC) were added over a period of 4 hr. and while applying external cooling to maintain the reaction mixture at or below a temperature of 39° C. (102° F). After the addition was completed the reaction mass was agitated for an additional 3 hr., then mixed with water containing approximately 5% NMP over a period of 4 hr. to coagulate and precipitate the polymer. After filtering, the filtercake was slowly washed with deionized water until the NMP content of a small, vacuum filtered sample was less than 3% by weight. The resin was again slurried with water, and then separated by centrifugation and pressed to provide a wetcake having a solids content of 37%.

Example 2

Preparation of Aqueous Polyamide-Amic Acid Solution

To a 1-liter, three-necked, round-bottom flask equipped with a mechanical stirrer and a thermometer were added 477 grams of deionized water and 22 grams of 99% pure triethylamine. To the stirred mixture were added, in three portions at 1-hr. intervals, 131 grams of polyamide-amic acid wetcake (37% polymer, 63% water), prepared substantially according to the procedure set forth in Example 1. The mixture was then stirred overnight at room temperature to provide an aqueous solution of the polyamide-amic acid salt.

Example 3

Film Casting

Films were cast from a polyamide-amic acid resin solution prepared, at a solids concentration of about 6.0 wt. %, substantially as described in Example 2.

The viscous solution of polyamide-amic acid was coated on a clean glass plate and spread using a glass rod to doctor the viscous solution evenly across the length of the plate. The coating was then dried in a circulating air oven at 80° C. for 1 hour to provide a tack-free polyamic acid coating on the glass substrate. The films were thermally cured by further heating at a temperature of about 200° C. for 5 hr. After cooling, the cast films were stripped from the substrate by dipping the glass plates in water, then dried. The resulting polyamide-imide films had a thickness of approximately 0.05 mm (2 mils).

Filling film pans, 4"×6"×0.5" deep, with a 6 wt. % solution of the polyamide-amic acid, drying by slow evaporation of the water in a circulating air oven held at 80° C. overnight, then curing the resulting film by heating at 300° C. for 4 hr., provides polyamide-imide film having a thickness of about 100 mils.

Example 4

Coating

Aqueous polyamide-amic acid compositions of this invention are also effective in providing adherent surface coatings for articles comprising a wide variety of ferrous and nonferrous metal and metal alloys, including copper, aluminum, steel and the like.

A viscous, 6 wt. % aqueous solution of the polyamic acid salt prepared as described, placed on a surface of a clean, 3"×8"×0.15" copper test panel at one end, and drawn evenly across the length of the panel using a doctor blade having a 80 mil spacing, provides the panel with a uniform coating of polyamide-amic acid resin solution. The coating, after being dried in a circulating air oven to 78° C. for 1 hr, then cured by heating at 300° C. for 180 min., provides the copper substrate with a tack-free, adherent polyamide-imide coating having an approximate thickness of 4 mils.

Fiber, in continuous strand as well as in chopped form, may be sized or coated with the aqueous polyamide-amic acid compositions of this invention. Coated and sized fiber and fabric will be useful in composite materials, and may be further compounded as reinforcement for rubber goods, filled plastic materials and the like having improved substrate-fiber adhesion.

Examples 5–8

Fiber Coating or Size

In the following examples, continuous fiber strand was coated with a solution of the polyamide-amic acid prepared as described in Example 2, generally according to the following procedure:

An approximately 1-meter-long strand of unsized fiber was pulled by hand lengthwise through a bath containing the aqueous polyamide-amic acid solution, held at room temperature. A wire fiber guide submersed in the solution ensured that the strand was fully immersed as it was being pulled through the bath. The procedure was repeated three or four times to ensure complete strand coverage. The coated fiber strand, hung from hooks in a circulating air oven, was then dried at 90° C. for one hour, then heated at 3° C./min to 150° C. and held for 30 minutes, and then at 3° C./min to 260° C. and held for 15 min. to cure the coating and provide a polyamide-imide coated fiber strand.

Four commercial fiber strand specimens were prepared and coated in this fashion, including a Kevlar® polyaramid fiber strand, a 6K PAN-based carbon fiber strand, a 12K pitch-based carbon fiber strand, and a glass fiber strand. After cooling, the strands were examined and evaluated by viewing the coated fibers using scanning electron microscopy (SEM).

Coated fiber strand having from about 0.1 to about 10 wt. % polyamide-amic acid resin as the coating or sizing, which may be present as the cured polyamide-imide counterpart, exhibits improved adhesion when combined with a variety of matrix materials and thus may find application in the production of fiber reinforced composites. Coated and sized fiber strand also may be used in continuous or chopped form as reinforcement in a variety of molded and extruded rubber goods, and in formulations comprising thermoplastic and thermoset resins and the like.

The invention will thus be seen to be an aqueous composition comprising from about 0.5 to about 40 wt. % of a polyamide-amic acid having an acid number greater than about 100, preferably from about 120 to the theoretical value for a 100 mole % polyamide-amic acid. Compositions comprising water and from about 20 to about 40 wt. % polyamide-amic acid resin, generally in the form of a wet powder or filter cake, combined with an effective amount of a water-miscible amine sufficient to dissolve the polyamide-amic acid, provide aqueous solutions comprising from about 0.5 to about 20 wt. % resin. Preferably the amine will be a tertiary aliphatic amine, soluble in water and volatile, and will be employed in stoichiometric excess with respect to the amic acid functionality present in the polyamide-amic acid. The aqueous solutions of the invention may also be characterized as comprising amine salts of polyamide-amic acids. On drying to remove water and at least a portion of the excess amine, films and coatings comprising amine salts of polyamide-amic acids are provided which are readily cured to form polyamide-imides. The invention thus may also be described as directed to coated and sized fiber and to articles comprising metal surfaces coated or sized with an amine salt of a polyamide-amic acid, and to a method for providing films and coatings comprising amine salts of polyamide-amic acid resins.

U. S. Provisional Application No. 60/123,961 filed Mar. 12, 1999 is hereby incorporated by reference in its entirety.

We claim:

1. An aqueous solution comprising
   a. a polyamide-amic acid having an acid number in the range of from about 120 mg KOH/g to the theoretical maximum value, said polyamide-amic acid comprising amide-amic acid units according to structural formula:

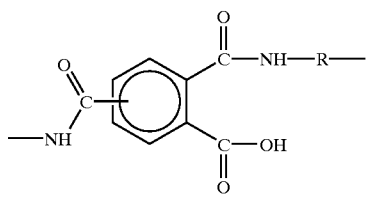

and amide-imide units according to the structural formula:

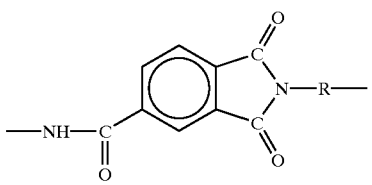

wherein R is divalent arylene radical and wherein the mole ratio of said amide-amic acid units to said amide-imide units lies in a range of from about 18:1 to about 5:1;
   b. from about 5 to about 50 wt. % tertiary aliphatic amine; and
   c. an amount of water sufficient to provide a polyamide-amic acid content of from about 0.5 to about 15 wt. %, based on the combined weight of said tertiary aliphatic amine, said water and said polyamide-amic acid.

2. The aqueous solution of claim 1 wherein said amide-amic acid units have the structure:

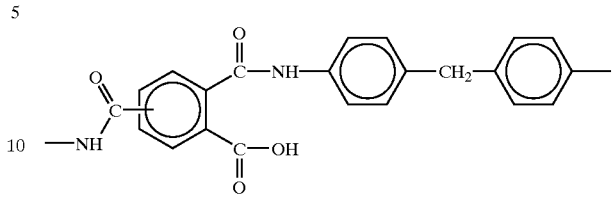

and said amide-imide units have the structure:

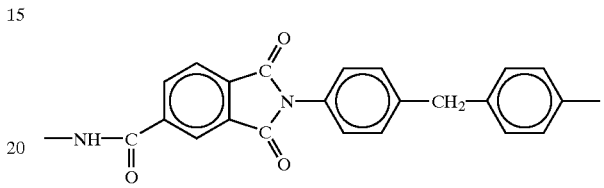

3. The aqueous solution of claim 1 wherein said acid number is from about 120 to about 150 mg KOH/g.

4. The aqueous solution of claim 1 wherein said tertiary aliphatic amine is triethylamine.

5. An aqueous coating composition comprising the aqueous solution of claim 1, and at least one additive selected from the group consisting of lubricants, colorants, fillers, and stabilizers.

6. The aqueous solution of claim 1 wherein said polyamide-amic acid is prepared by polymerizing, under substantially anhydrous conditions in an inert polar solvent, a monomer mixture containing trimellitic acid halide and at least one aromatic diamine to provide a solution of said polyamide-amic acid; precipitating the polyamide-amic acid with water; collecting the solid polyamide-amic acid and washing with water to obtain a solid having a residual polar solvent content in the range of from about 0.1 to about 5 wt. %; and reducing the water content of the composition to a level of from about 40 to about 70 wt. %.

7. An aqueous solution according to claim 6 wherein said aromatic diamine comprises 4,4'-methylenedianiline.

8. A method for providing at least one surface of an article with an adherent polyamide-imide film comprising the steps of coating said surface with an aqueous solution of claim 1, drying said coating and thereby providing adherent film comprising a tertiary amine salt of a polyamide-amic acid, then heating said article to cure said film.

9. The method of claim 8, wherein said polyamide-amic acid is prepared by polymerizing, under substantially anhydrous conditions in an inert polar solvent, a monomer mixture containing trimellitic acid halide and at least one aromatic diamine to provide a solution of said polyamide-amic acid; precipitating the polyamide-amic acid with water; collecting the solid polyamide-amic acid and washing with water to obtain a solid having a residual polar solvent content in the range of from about 0.1 to about 5 wt. %; and reducing the water content of the composition to a level of from about 40 to about 70 wt %.

10. The method of claim 9 wherein said aromatic diamine comprises 4,4'-methylaniline.

11. A film comprising the tertiary amine salt of a polyamide-amic acid, said film prepared from the aqueous solution of claim 1.

12. Coated fibers comprising the film of claim 11 as an adherent coating.

13. Heat treated coated fibers of claim 12.

14. Articles of manufacture comprising the film of claim 11.

15. A metal article having the film of claim 11, adherent to at least one surface thereof.

16. An aqueous solution consisting essentially of a. a polyamide-amic acid having an acid number in the range of from about 120 mg KOH/g to the theoretical maximum value, said polyamide-amic acid comprising amide-amic acid units according to structural formula:

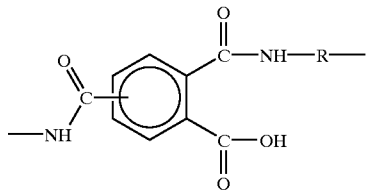

and amide-imide units according to the structural formula:

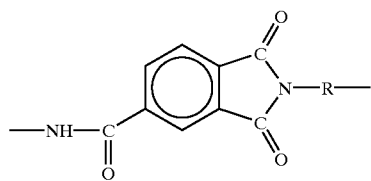

wherein R is divalent arylene radical and wherein the mole ratio of said amide-amic acid units to said amide-imide units lies in a range of from about 18:1 to about 5:1;

b. from about 5 to about 50 wt. % tertiary aliphatic amine; and c. an amount of water sufficient to provide a polyamide-amic acid content of from about 0.5 to about 15 wt. %, based on the combined weight of said tertiary aliphatic amine, said water and said polyamide-amic acid.

* * * * *